(12) United States Patent
Giffin

(10) Patent No.: US 12,375,437 B1
(45) Date of Patent: Jul. 29, 2025

(54) SYSTEM FOR CREATING, PROCESSING, AND REVIEWING ELECTRONIC COMMUNICATIONS LOCALLY

(71) Applicant: Numquam Mittere, LLC, Knoxville, TN (US)

(72) Inventor: Jamen Giffin, Knoxville, TN (US)

(73) Assignee: Numquam Mittere, LLC, Knoxville, TN (US)

( * ) Notice: Subject to any disclaimer, the term of this patent is extended or adjusted under 35 U.S.C. 154(b) by 0 days.

(21) Appl. No.: 18/529,543

(22) Filed: Dec. 5, 2023

Related U.S. Application Data

(60) Provisional application No. 63/430,434, filed on Dec. 6, 2022.

(51) Int. Cl.
G06F 15/16 (2006.01)
H04L 51/214 (2022.01)
H04L 51/52 (2022.01)

(52) U.S. Cl.
CPC ............ H04L 51/214 (2022.05); H04L 51/52 (2022.05)

(58) Field of Classification Search
CPC ....... H04L 51/214; H04L 51/52; H04L 51/21; H04L 51/00; H04L 51/42; H04L 51/58
USPC ................................................. 709/206, 204
See application file for complete search history.

(56) References Cited

U.S. PATENT DOCUMENTS

| | | | |
|---|---|---|---|
| 8,965,984 B2 | 2/2015 | Carrara et al. | |
| 9,305,289 B2 | 4/2016 | Roic et al. | |
| 9,479,469 B2 | 10/2016 | Kabbes et al. | |
| 9,613,340 B2 | 4/2017 | Safa | |
| 9,922,309 B2 | 3/2018 | Claux et al. | |
| 10,063,501 B2 | 8/2018 | Lane et al. | |
| 10,140,291 B2 | 11/2018 | Brunn et al. | |
| 10,216,709 B2 | 2/2019 | Lane et al. | |
| 10,305,830 B2 | 5/2019 | Manning et al. | |
| 10,785,177 B1 | 9/2020 | Walters et al. | |
| 10,963,584 B2 | 3/2021 | Safa et al. | |
| 11,075,871 B2 | 7/2021 | Soni et al. | |
| 11,750,553 B2 * | 9/2023 | Robb | G06Q 10/107 709/206 |
| 2004/0049696 A1 * | 3/2004 | Baker | G06Q 10/107 709/204 |
| 2005/0050145 A1 * | 3/2005 | Lowe | H04L 51/214 709/206 |
| 2005/0108332 A1 * | 5/2005 | Vaschillo | H04N 1/00209 709/206 |
| 2007/0180035 A1 * | 8/2007 | Liu | G06Q 10/107 709/206 |

(Continued)

*Primary Examiner* — Kaylee J Huang
(74) *Attorney, Agent, or Firm* — Blanchard Horton PLLC

(57) ABSTRACT

A local device review system for electronic communications is described that provides the interface and emotional connection of a transmission-capable email or posting system to a user, but where the system cannot transmit any communication data entered outside of the local device. The review system allows the user to review the created electronic communication after the communication is processed internally through the review system, preferably after a previously selected time delay. The user may then elect to permanently delete or retain the internally processed electronic communication or transfer the text or otherwise of the electronic communication to a separate transmission-capable application residing on the computing device.

25 Claims, 8 Drawing Sheets

(56) References Cited

U.S. PATENT DOCUMENTS

2008/0005250 A1* 1/2008 Oksum ............... H04L 51/08
                                                709/206
2009/0216843 A1* 8/2009 Willner ............... H04L 51/42
                                                709/206

* cited by examiner

SYSTEM FOR CREATING, PROCESSING, AND REVIEWING ELECTRONIC COMMUNICATIONS LOCALLY

REFERENCE TO RELATED APPLICATIONS

This application claims the benefit of U.S. Provisional Application No. 63/430,434 entitled "System for Processing and Reviewing Local Electronic Communications" filed Dec. 6, 2022, which is incorporated by reference in its entirety.

BACKGROUND

The extraordinary benefits of email, microblogging, and similar "instant written communication with others" technologies have proven ubiquitous over the past few decades. However, generating a new email message, writing the text, and pressing the "send" button is so easy, that without much effort a detrimental set of words can be tied to someone's name and sent into cyberspace where it is forever available. While some email systems have "call-back" functionality, such functionality is generally unreliable in removing the email from a recipient's inbox. Microblogging applications, such as Twitter and the like, have two solutions to the unintended, "wish I had not said that" communication dilemma: (a) the user can remove the post at a later time, but usually not before other viewers have viewed and preserved the communication (often to be re-posted or screenshotted and shared later from another source); or (b) the user can be suspended or banned from ever using the application again and the thread deleted by an administrator. The problems with such a user "death sentence" include the fact that the communication was likely already viewed as in (a) and such disciplinary action is not likely the user desired solution.

For email, several attempts have been made to address the problem of communication regret, some by software companies, and others by users. An example of a software solution is email systems having the option to check a box for "draft" when preparing the communication. Such systems are designed that when sent, the email is not transmitted, but is instead rerouted to a different folder, such as a drafts folder or an outbox folder. In this way the user may review the communication when desired and then send by pressing an additional icon or the equivalent.

This solution has proven mostly ineffective as most email users are unaware of this 'draft' check box option or of the system configuration requiring a later manual sending action. If users are aware of the draft check box option, they often find that they send a high volume of emails daily making it impractical to check the box and review every email sent during the day. Alternatively, applying the draft check box option intermittently for a selected number of emails daily can prove exhaustive with repetitiously opening the settings interface and checking and unchecking the box repeatedly.

If users do engage in using the 'draft' check box, there are two potential failures: (a) human error may think the correct box is checked when it is not resulting in unintentionally sending the email without review; and (b) if the box is checked correctly, human error may still lead to the transmission of an unintended email after re-reading the rerouted email, if the user reviews the email too soon or in haste after preparing it. Thus, these systems lack an enforced "cooling-off" period between preparation and review/send as there is no time delay before the reviewable message is accessible to the user after preparation.

Two examples of user-based solutions to the communication regret problem arising from a single click of the send button are as follows. First, a user may type the text into an email system's message interface but without providing an address in the "To" box until the user is fully ready to send. A disadvantage of this "solution" is that the author knows as he/she types that pressing the send button will result in an error notification and thus there is no feeling that the email can be or will be sent (the emotional connection with the "send" button includes watching the email's message interface vanish after pressing it, a "wush" sound, and the like).

Second, a user may type the message into a word processing system knowing that regardless of action, the word processor cannot transmit the message. The problem with this user solution is that when typing correspondence to a would-be recipient when the author is emotional or distressed, using a word processor lacks any feeling of typing the email that only the interface of an email system provides with the added emotional connection of having a "send" button (or a button synonymous with "send"). Thus, also lacking the proper "emotional" connection to a true email interface.

Such user-based solutions, along with their associated problems, can also apply to micro-blogging applications, but since micro-blogging is not commonly used in business practice (other than public relations type positions), user-based solutions being executed prior to publishing micro-blog posts are not widely known to exist.

As with micro-blogging applications, text-messaging applications are another area where user-based solutions implemented prior to sending a text-message are not widely known to be used, or for that matter, to exist. Even so, for almost everyone who texts on a regular basis, a text-message is normally sent before the typo or other undesirable is recognized, and the user rapidly sends a follow-up text to recover from the embarrassment to the extent possible. It is unknown why users only tend to notice the problem in text-messages until after the text is sent, but the issue is commonplace.

Another life circumstance where the communication regret problem can arise is with children. While children may have a desire to use both email and micro-blogging systems at an early age, many parents would prefer their kids not having the ability to post text, pictures, videos, or other correspondence on social media or emails without their prior review. This is because many parents feel their children are not yet ready from a maturity standpoint to handle the potential criticism from others, and a realization that what their children send, or post, might carry with them for the remainder of their natural lives. There currently is no electronic device application tailored to children allowing children to go through the motions of fully "sending" an email or posting a micro-blog with a complete guarantee that no one outside of the household will ever see the communication.

As can be seen from the above description, there is an ongoing need for simple and efficient system to allow a user to prepare an email, micro-blog post, or text-message while having the emotional connection to the respective email/messaging system, but with zero potential of the communication ever leaving the local computing device. The systems and methods of present invention overcomes at least one of the disadvantages associated with conventional software and user-implemented communication review systems.

SUMMARY

In one aspect, the invention provides a computing device for creating, processing, and reviewing electronic communications locally, the computing device comprising: memory, a processor, a user input device, and a user feedback device in electrical communication, where the memory includes software that when executed by the processor implements an input interface and an output interface on the output device; where the input interface provides an electronic communication visual interface to a user, where when the user instructs the input interface to generate an electronic communication screen, the input interface permits the user to enter communication data in the form of textual information to form an electronic communication, where when the user instructs the input interface to send the electronic communication, the input interface provides feedback to the user establishing that the electronic communication was sent, where the electronic communication is sent to the output interface and the output interface signals the user that an electronic communication was received, where the output interface allows the user to open and review the received electronic communication, and where the electronic communication cannot be transmitted outside of the computing device as the input interface and the output interface lack the capability to transmit the electronic communication outside of the computing device.

In another aspect of the invention, there is a method of creating, processing, and reviewing electronic communications locally, the method comprising; inputting into an input interface appearing to be a transmission-capable electronic communication system electronic communication data to create an electronic communication; instructing the input interface to transmit the electronic communication, where the input interface signals that the electronic communication was transmitted; and instructing an output interface to display the electronic communication for review in response to the output interface signaling that an electronic communication was received from the input interface, where the electronic communication cannot be transmitted outside of the computing device as the input interface and the output interface lack the capability to transmit the electronic communication outside of a computing device comprising the input interface and the output interface.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the claims that follow. The scope of the present invention is defined solely by the appended claims and is not affected by the statements within this summary.

BRIEF DESCRIPTION OF THE FIGURES

The invention can be better understood with reference to the following drawings and description. In the figures like referenced numerals designate corresponding parts throughout the different views.

DETAILED DESCRIPTION

A local device review system for electronic communications is described that provides the interface and emotional connection of a transmission-capable email or posting system to a user, but where the system cannot transmit any communication data entered outside of the local device. The review system allows the user to review the created electronic communication after the communication is processed internally through the review system, preferably after a previously selected time delay. The user may then elect to permanently delete or retain the internally processed electronic communication or transfer the text or otherwise of the electronic communication to a separate transmission-capable application residing on the computing device.

Figure 1:
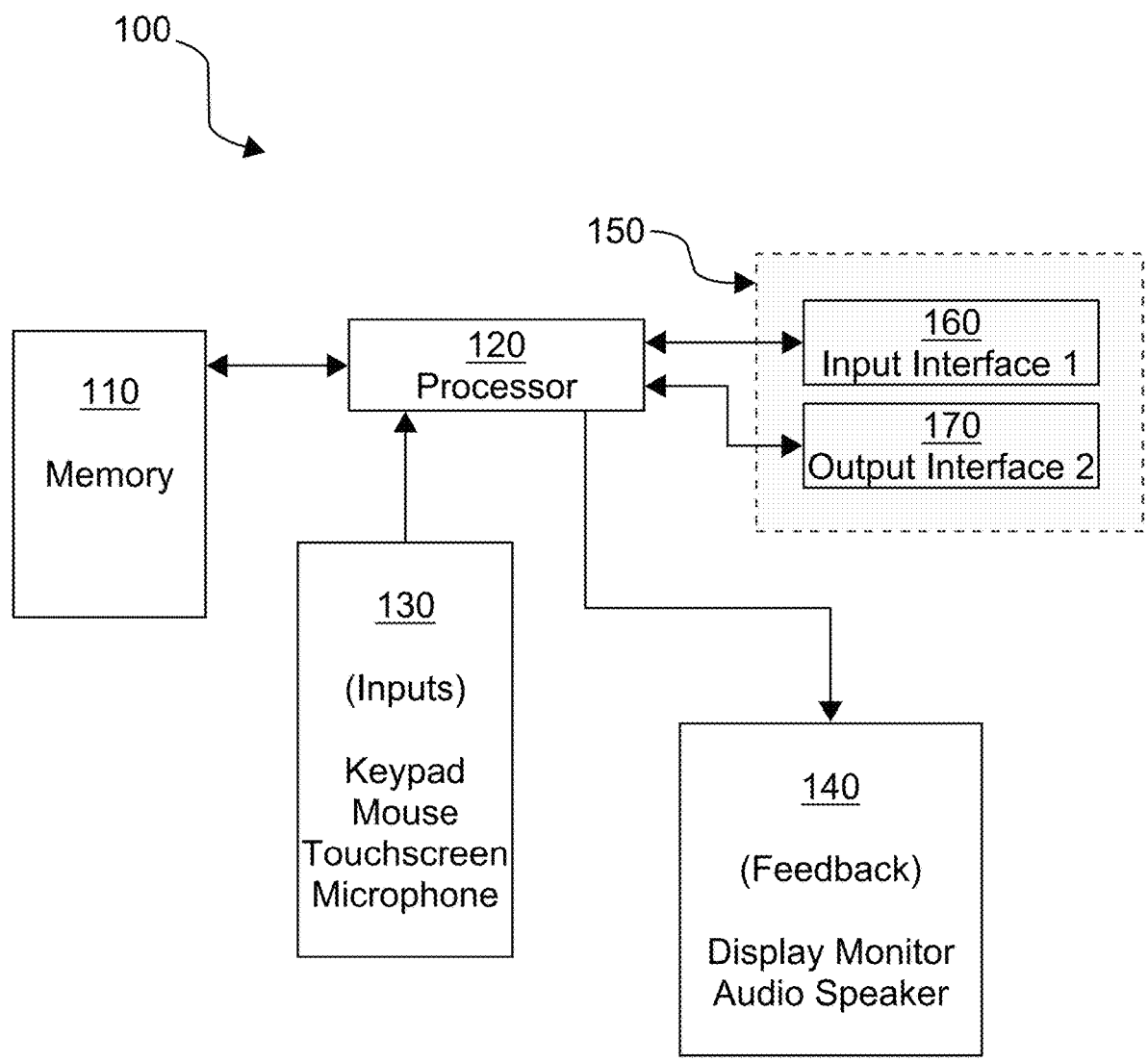
FIG. 1 represents a computing device with a local device review system implemented in the computing device.

FIG. 1 represents a computing device 100 with a local device review system 150 implemented in the computing device 100 being used by the user. The computing device 100 includes memory 110, where the communication review system is accessed, in electrical communication with a processor 120, a user input device 130, and a user feedback device 140. The computing device 100 may be a desktop computer, cell phone, smart phone, tablet computing device, laptop computing device, personal digital assistant (PDA), MP3 player, and the like as capable of receiving input textual communication and outputting such textual communication to the same user. The user input device 130 may include one or more of a keypad, mouse, touchscreen, camera, microphone, and the like as required to enter text into the computing device 100. The user feedback device 140 may include one or more of a display monitor, an audio speaker, and the like as required for the user to review the entered text on the computing device 100.

The local device review system 150 includes software in the memory 110 that when executed by the processor 120 implements an input user interface 160 on the user input device 130 and an output user interface 170 on the user feedback device 140.

Figure 2:
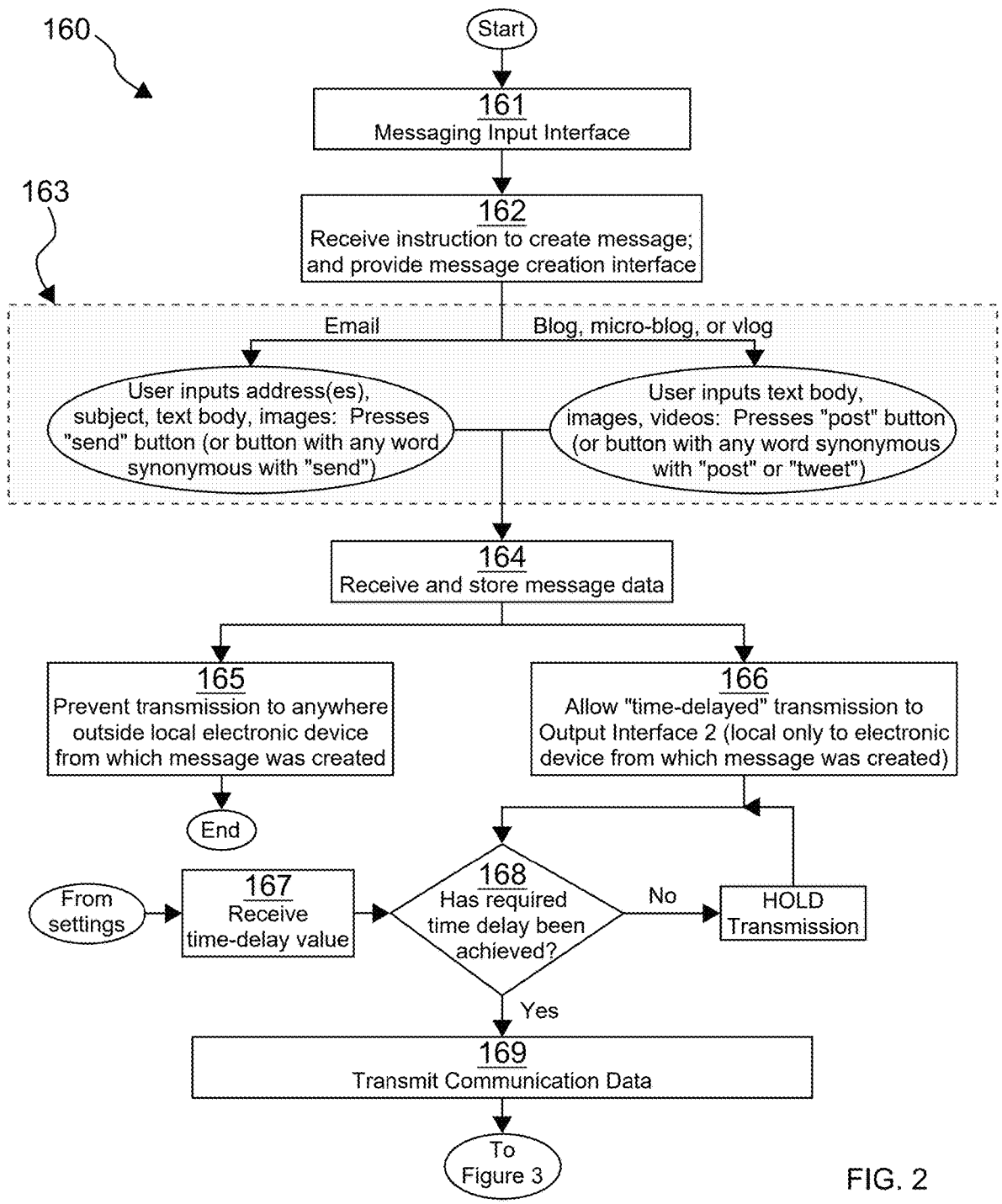
FIG. 2 represents the input user interface where messaging input interface provides an email, blog "like" or similar social media, and the like visual interface to the user.

FIG. 2 represents the input user interface 160 where messaging input interface 161 provides an email, blog "like" or similar social media, and the like visual interface to the user. In 162 the user clicks on an icon button or takes equivalent action from the messaging input interface 161 to instruct the input user interface 160 to generate an email, or micro-blog creation screen, or the like where text and other information may be entered by the user.

In 163 the user enters the desired information to create an email or blog post. For an email electronic communication, this would include field information such as the TO email address, any CC and/or BCC email addresses, the SUBJECT field, the body text of the email, images, signatures, and the like. The user then presses the "send" icon or an equivalent icon synonymous with send after the communication is prepared. The input user interface 160 then provides "message sent" feedback to the messaging input interface 161 and thus the user, such as a "wush" sound, the "outbox" label of the messaging input interface 161 gaining a [1] which shortly disappears, and the like.

Similarly, for electronic communications in the form of a blog type post, such as Twitter, WhatsApp, Viber, Line, and the like, the user enters the body text of the post, images, signatures, and the like. The user then presses the "post" or "tweet" icon having similar functionality to the send icon for an email after the communication is complete. The input user interface 160 then provides user feedback via the messaging input interface 161 associated with a successful post.

In 164, the local device review system 150 then receives and stores the data entered for the communication through the messaging input interface 161 into the memory 110.

As the local device review system 150 is only local to the computing device 100, in 165 the local device review system 150 prevents transmission of the data entered for the communication outside of the computing device 100, as the input user interface 160 and the output user interface 170 lack the capability to transmit the electronic communication other than between themselves.

Unlike conventional electronic communication systems having the ability to transmit electronic communications outside of the computing device 100, and thus send electronic communications outside of the local device unless the user takes action to prevent such, the local device review system 150 cannot transmit electronic communications outside of the computing device 100 regardless of action or lack thereof by the user. Thus, the local device review system 150 is not enabled with IMAP, SMTP, POP3, or other transmission protocol that is connected to the internet or a network in a way that allows for transmission of the communication data outside of the computing device 100.

In time delay 166, the local device review system 150 preferably implements a time delay responsive to a user preselected time delay value 167 before transmitting the communication data to the output user interface 170. In 168, once the preferred implemented time delay value 167 is achieved, the local device review system 150 transmits the communication data to the output user interface 170 in transmit communication data 169. The time delay value 167 preferably is at least five minutes, with time delays from one hour to three days being more preferred.

Figure 3:
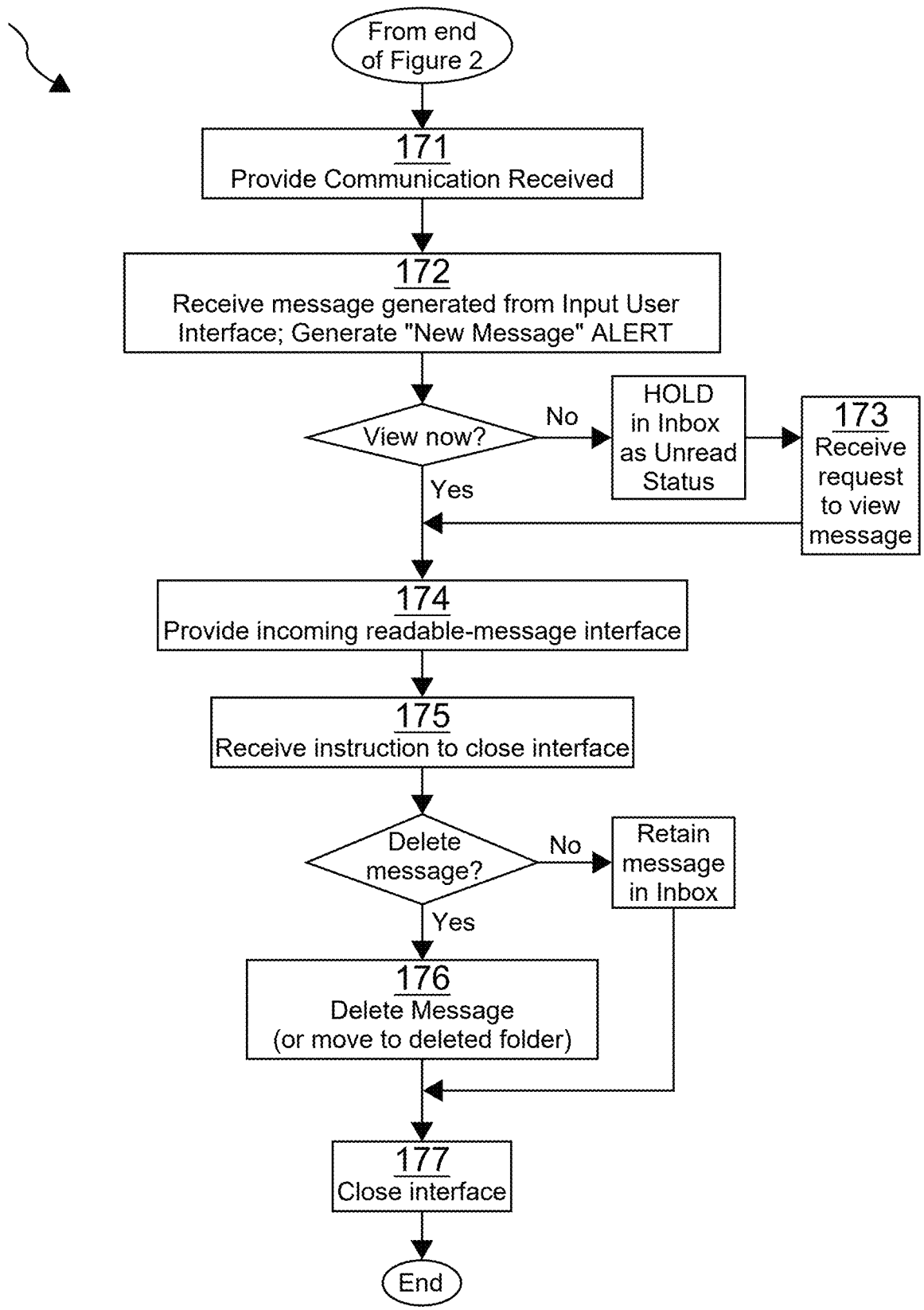
FIG. 3 represents the output user interface where provide communication received provides an email or blog "like" or similar social media visual interface to the user where the visual interface is of the type commonly associated with a received communication.

FIG. 3 represents the output user interface 170 where provide communication received 171 provides an email or blog "like" or similar social media visual interface to the user where the visual interface is of the type commonly associated with a received communication. In 172, the output user interface 170 receives the message from the input user interface 160 and visually and/or audibly notifies the user that a new communication was received. As an example, a highlighted message would appear in the inbox with a "[1]" appearing next to the inbox, a "you've got mail" visual or audible message, and the like. In 173, the output user interface 170 holds the message until the user clicks on an icon or the like to instruct the output user interface 170 to display the communication data.

In 174, the output user interface 170 provides a readable-message interface including the textual and any additional information associated with the communication, such as images, signatures, and the like. In 175, the user can close the readable-message interface as provided in 174 after choosing to highlight and copy any desired text to a separate application that unlike the local device review system 150 can transmit the communication, thus being transmission-capable. In addition to highlighting and copying, the local device review system 150 may be configured where the user has the option to transfer the communication to a separate transmission-capable application residing on the computing device 100, which unlike the local device review system 150, can transmit the communication beyond the computing device 100.

In 176, the user can then determine if they wish to retain the message in the "inbox" or delete the message, thus permanently deleting or optionally transferring the message to a deleted items folder or the like. In 177, the user may close the output user interface 170. If the message is retained, the user can return to the local device review system 150 later and copy text from the output user interface 170 to paste into or otherwise transfer the message to a separate transmission-capable application residing on the computing device 100.

Figure 4:
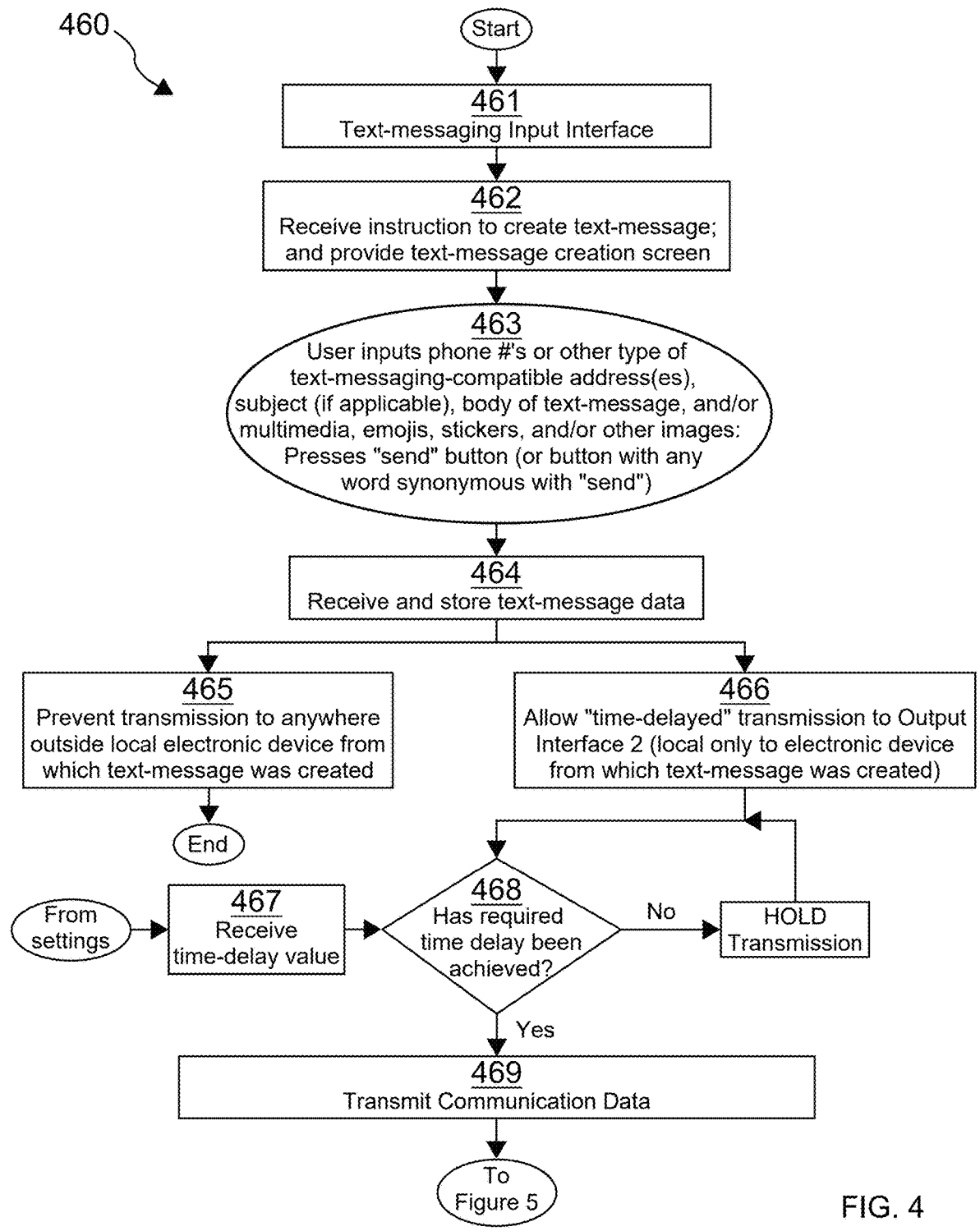
FIG. 4 represents input user interface where text-messaging input interface provides a text-message or "text-message like" visual interface to the user.

FIG. 4 represents input user interface 460 where text-messaging input interface 461 provides a text-message or "text-message like" visual interface to the user. In 462 the user clicks on an icon button or takes equivalent action from the text-messaging input interface 461 to instruct the input user interface 460 to generate a text-message creation screen, or the like where text and other text-message compatible information may be entered by the user.

In 463 the user enters the desired information to create a text-message. For text-message electronic communication, this would include field information such as one or more phone numbers or other types of text-messaging compatible information such as images, emojis, stickers, and the like. The user then presses the "send" icon or an equivalent icon synonymous with send after the text-message is prepared. The input user interface 460 then provides "text-message sent" feedback to the text-messaging input interface 461 and thus the user, such as a "wush" sound, one or more checks of variable colors displayed under the text-message, a color change of the text-message, and the like.

In 464, the local device review system 150 then receives and stores the data entered for the text-message through the text-messaging input interface 461 into the memory 110.

As the local device review system 150 is only local to the computing device 100, in 465 the local device review system 150 prevents transmission of the data entered for the text-message outside of the computing device 100, as the input user interface 460 and the output user interface 470 (FIG. 5) lack the capability to transmit the text-message other than between themselves.

Unlike conventional electronic communication systems having the ability to transmit electronic communications outside of the computing device 100, and thus send electronic communications outside of the local device unless the user takes action to prevent such, the local device review system 150 cannot transmit electronic communications outside of the computing device 100 regardless of action or lack thereof by the user. Thus, the local device review system 150 is not enabled with IMAP, SMTP, POP3, or other transmission protocol that is connected to the internet or a network in a way that allows for transmission of the communication data outside of the computing device 100.

In time delay 466, the local device review system 150 preferably implements a time delay responsive to a user preselected time delay value 467 before transmitting the communication data to the output user interface 470. In 468, once the preferred implemented time delay value 467 is achieved, the local device review system 150 transmits the communication data to the output user interface 470 in transmit communication data 469. The time delay value 467 preferably is at least five minutes, with time delays from one hour to three days being more preferred.

Figure 5:
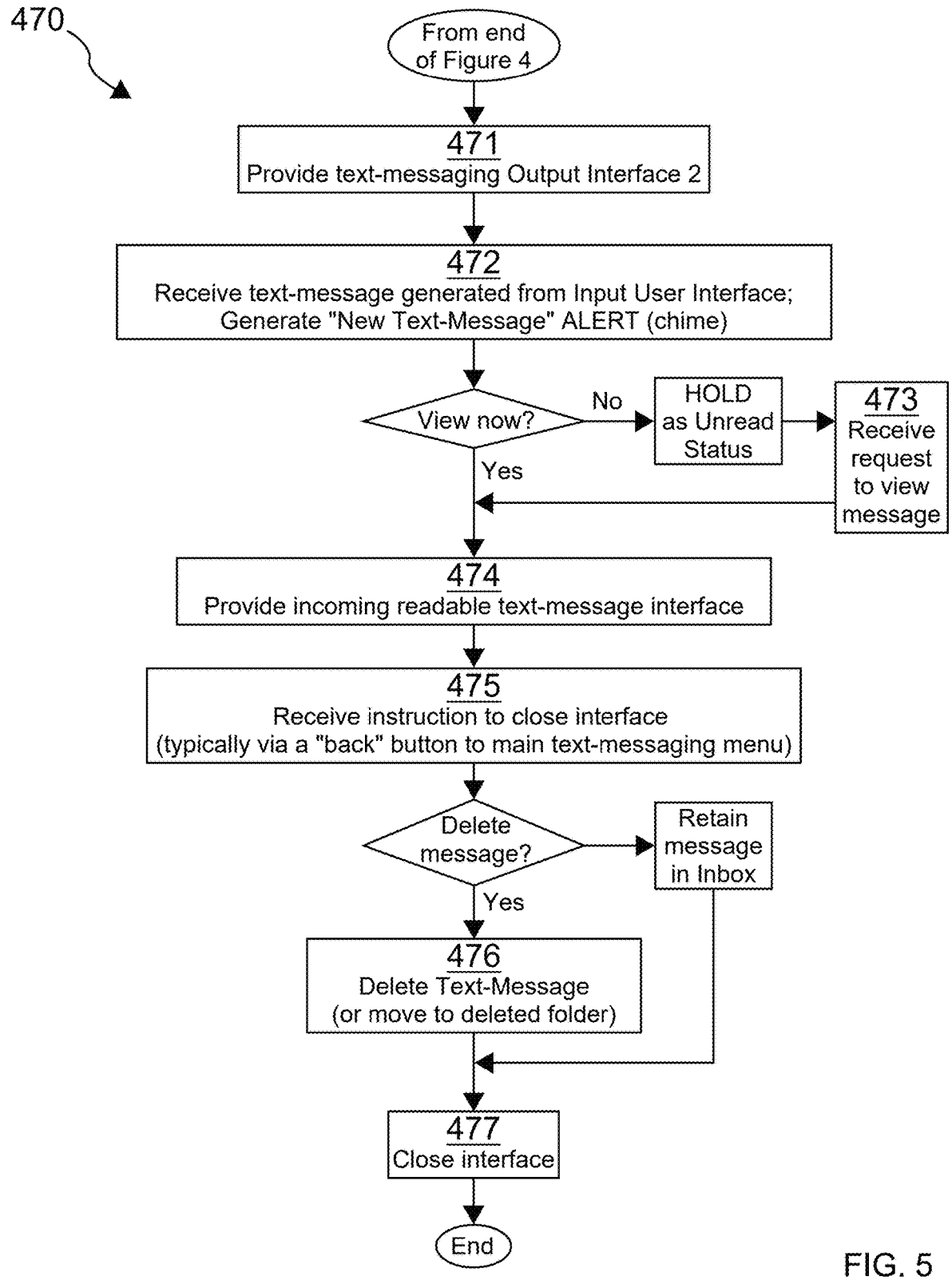
FIG. 5 represents the output user interface where provide text-message received provides a text-message or "text-message like" visual interface to the user where the visual interface is of the type commonly associated with a received text-message.

FIG. 5 represents the output user interface 470 where provide text-message received 471 provides a text-message or "text-message like" visual interface to the user where the visual interface is of the type commonly associated with a received text-message. In 472, the output user interface 470 receives the text-message from the input user interface 460 and visually and/or audibly notifies the user that a new text-message was received. As an example, a chime would sound and a notification would appear on the home screen of a smart phone, and the like. In 473, the output user interface 470 holds the message until the user clicks on an icon, the home screen notification, or the like to instruct the output user interface 470 to display the text-message.

In 474, the output user interface 470 provides a readable-text-message interface including the textual and any additional information associated with the text-message, such as images, emojis, stickers, and the like. In 475, the user can close the readable-text-message interface as provided in 474 (such as by touching the "back" icon on a smartphone) after choosing to highlight and copy any desired text to a separate application that unlike the local device review system 150 can transmit the text-message, thus being transmission-capable. In addition to highlighting and copying, the local device review system 150 may be configured where the user has the option to transfer the text-message to a separate transmission-capable application residing on the computing device 100, which unlike the local device review system 150, can transmit the communication beyond the computing device 100.

In 476, the user can then determine if they wish to retain the text-message or delete the text-message, thus permanently deleting or optionally transferring the text-message to a deleted items folder or the like. For many smartphones, for example, a deleted items folder or the like does not exist, thus if the user chooses to delete the text-message, it is permanently deleted. In 477, the user may close the output user interface 470. If the text-message is retained, the user can return to the local device review system 150 later and copy text from the output user interface 470 to paste into or otherwise transfer the text-message to a separate transmission-capable application residing on the computing device 100.

As previously mentioned, the local device review system 150 is incapable of transmitting electronic communication data outside of the computing device 100. However, the local device review system 150 software may be implemented across a network or the like where a network administrator can install or uninstall the software from any single computing device 100. Thus, the local device review system 150 may be implemented in such an "office" setting with administrator control of the software. In such a network environment, the local device review system 150 is preferably implemented where deletion of the review system software from a user's computing device results in any retained communication data being permanently deleted.

Figure 6:
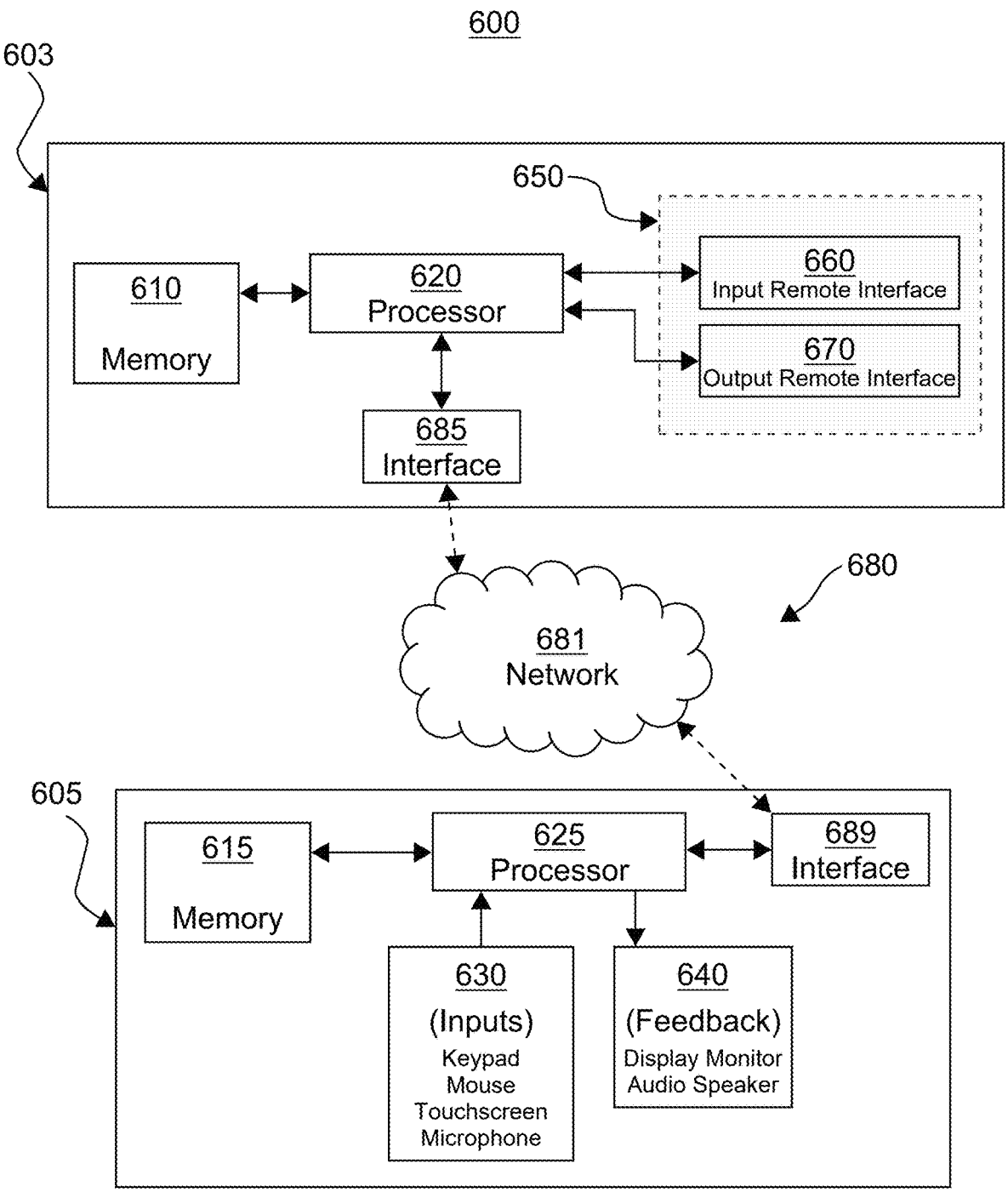
FIG. 6 represents a local device review system where the user interacts with a user input/feedback electronic device allowing inputs by the user and feedback to the user, but where the local device is implemented as a remote local device in electrical communication with, but remote from, the user input/feedback electronic device.

FIG. 6 represents a local device review system 650 where the user interacts with a user input/feedback electronic device 605 allowing inputs by the user and feedback to the user, but where the local device is implemented as a remote local device 603 in electrical communication with, but remote from, the user input/feedback electronic device 605. Hence, in response to user inputs obtained from the user input/feedback electronic device 605, the remote local device 603 provides review system functionality including the optional delay and relays the results back to the user input/feedback electronic device 605. As previously discussed, this implementation of the local device review system 650 may be useful for email, blog and social media systems, text-messaging, and the like. Thus, the user input/feedback electronic device 605 in combination with the remote local device 603 function to provide a computing device 600 providing the local device review system 650.

The user input/feedback electronic device 605 includes memory 615 in electrical communication with a processor 625, a user input device 630, and a user feedback device 640. The user input/feedback electronic device 605 may be a desktop computer, laptop computer, cellular phone, smart phone, tablet, personal digital assistant (PDA), MP3 player, and the like as capable of receiving input textual communication and outputting such textual communication to the same user. The user input device 630 may include one or more of a keypad, mouse, touchscreen, camera, microphone, and the like as required to enter text into the user input/feedback electronic device 605. The user feedback device 640 may include one or more of a display monitor, an audio speaker, and the like as required for the user to review the entered text on the user input/feedback electronic device 605.

The remote local device 603 is a computing device including memory 610, where the communication review system is accessed, in electrical communication with a processor 620. The remote local device 603 is a computing device with the ability to communicate with multiple connected user input/feedback electronic devices 605, generally taking the form a "server", but that can take the physical form of a desktop computer, laptop computer, and the like. The remote local device 603 is preferably provided in the "cloud" or a similar shared computing resource.

Network 681 provides electrical communication between remote local interface 685, which is in electrical communication with the processor 620 of the remote local device 603, and user device interface 689, which is in electrical communication with the processor 625 of the user input/feedback electronic device 605. The network 681 preferably exists in the "cloud" or similar shared computing resource. Electrical communication between the network 681 and the remote local interface 685 is preferably wired, while electrical communication between the network 681 and the user device interface 689 is preferably wireless, but in either instance, electrical communication may be provided wired or wirelessly.

Figure 7:
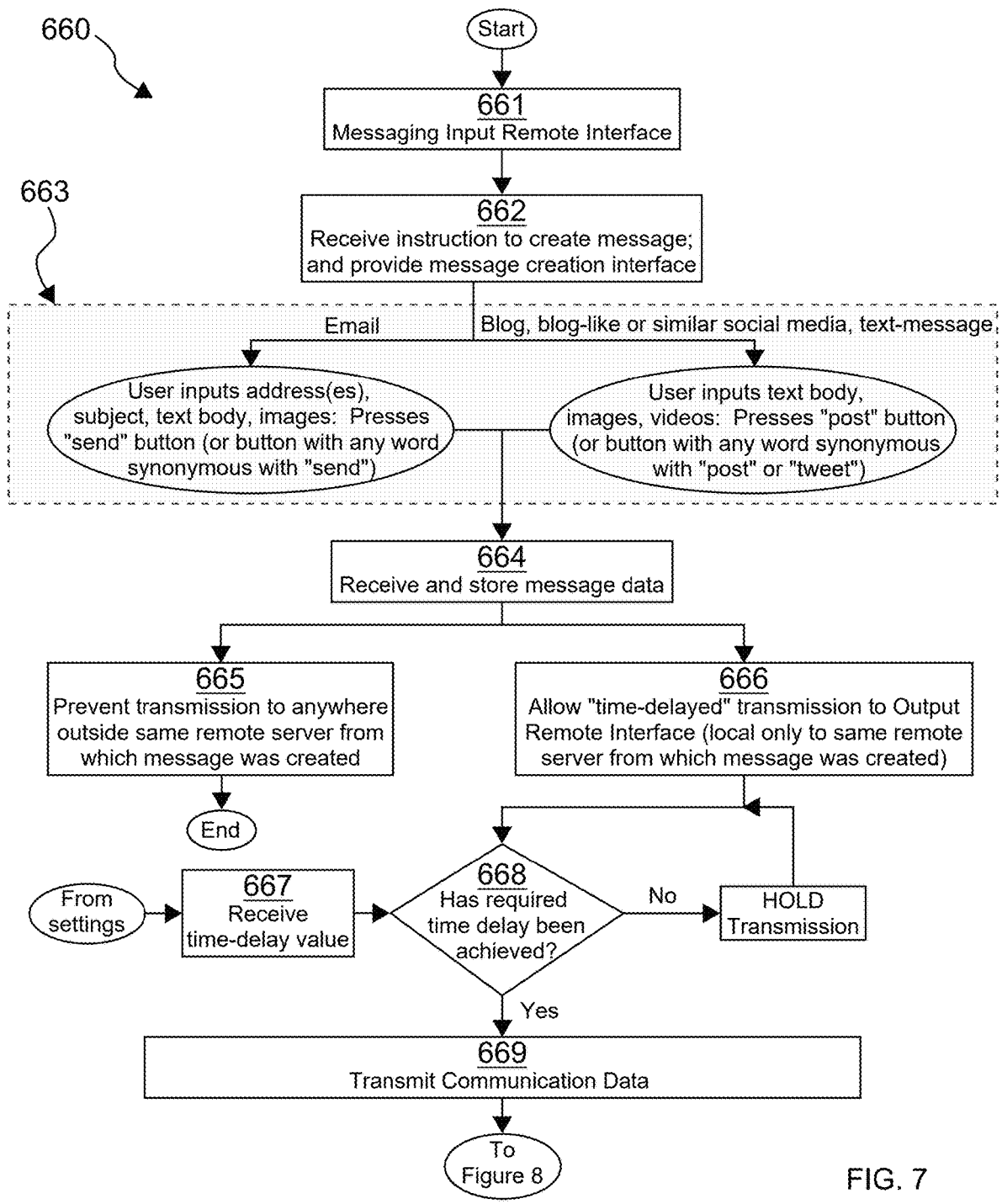
FIG. 7 represents input remote interface where messaging input remote interface provides an email, blog "like" or similar social media, text-message, and the like visual interface to the user via the network and the user input/feedback electronic device.

FIG. 7 represents input remote interface 660 where messaging input remote interface 661 provides an email, blog "like" or similar social media, text-message, and the like visual interface to the user via the network 681 and the user input/feedback electronic device 605. In 662 an instruction is received from the user via the network 681 and the user input/feedback electronic device 605 as the user clicks on an icon button or takes equivalent action from the messaging input remote interface 661 to instruct the input remote interface 660 to generate an email, blog "like" or similar social media, text-message, and the like visual interface on the user input/feedback electronic device 605 where text and other information may be entered by the user.

In 663 the user enters the desired information via the user input/feedback electronic device 605 to create an email, post, or text-message. For an email electronic communication, this would include field information such as the TO email address, any CC and/or BCC email addresses, the SUBJECT field, the body text of the email, images, signatures, and the like. The user then presses the "send" icon or an equivalent icon synonymous with send after the communication is prepared. The input remote interface 660 then provides "message sent" feedback to the user via the user input/feedback electronic device 605, such as a "wush" sound, the "outbox" label of the input user interface 660 gains a [1] which shortly disappears, checks appear and/or change colors, and the like.

Similarly, for electronic communications in the form of a blog type post, such as Twitter, WhatsApp, Viber, Line, and the like, the user enters the body text of the post, images, signatures, and the like. The user then presses the "send", "post", or "tweet" icon having similar functionality to the send icon for an email after the communication is complete. The input remote interface 660 then provides user feedback via the messaging input remote interface 661 as associated with successfully sending, posting, and the like of the communication via the user input/feedback electronic device 605.

In 664, the local device review system 650 then receives and stores the data entered for the communication as stored in the memory 615 through the messaging input remote interface 661 into the memory 610 of the remote local device 603.

As the local device review system 650 is only local to the computing device 600, the local device review system 650 in 665 prevents transmission of the data entered for the communication outside of the computing device 600 as the input remote interface 660 and the output remote interface 670 lack the capability to transmit the electronic communication other than between themselves and the network 681.

Unlike conventional electronic communication systems having the ability to transmit outside of the local device, and thus send electronic communications outside of the local device unless the user takes action to prevent such, the local device review system 650 cannot transmit electronic communications outside of the computing device 600 regardless of action or lack thereof by the user. Thus, the local device review system 650 is not enabled with IMAP, SMTP, POP3, or other transmission protocol that is connected to the internet or a network in a way that allows for transmission of the communication data outside of the computing device 600.

In time delay 666, the local device review system 650 preferably implements a time delay responsive to a user preselected time delay value 667 before transmitting the communication data to the output remote interface 670. The time delay value may have been previously entered via the user input/feedback electronic device 605 or may be entered directly into the remote local device 603, such as when the remote local device 603 is providing the local device review system 650 to multiple user input/feedback electronic devices 605.

In 668, once the preferred implemented time delay value 667 is achieved, the local device review system 650 transmits the communication data to the output remote interface 670 in transmit communication data 669. The time delay value 667 preferably is at least five minutes, with time delays from one hour to three days being more preferred.

Figure 8:
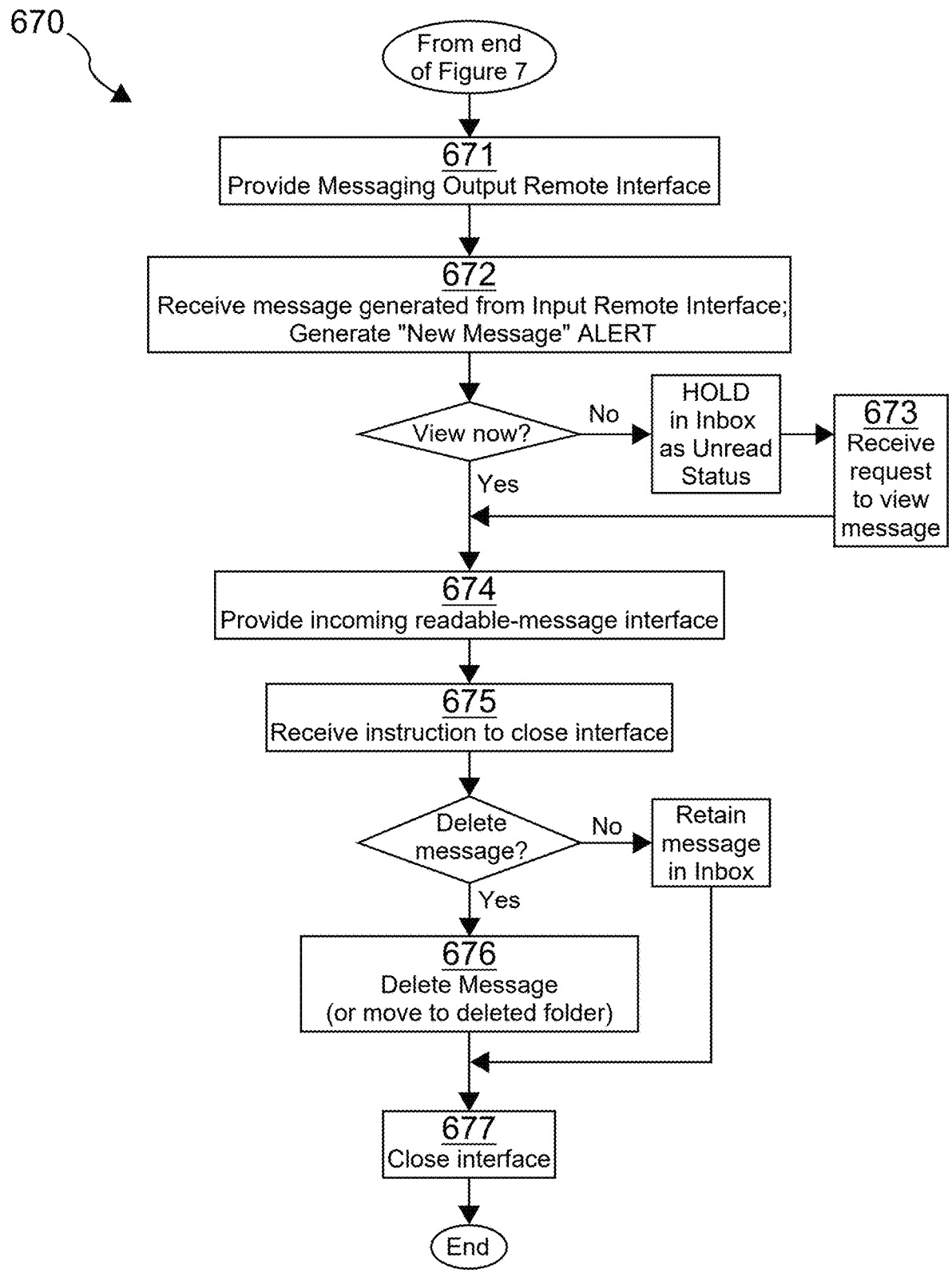
FIG. 8 represents the output remote interface where provide communication received provides an email, blog "like" or similar social media, text-message, and the like visual interface to the user where the visual interface is of the type commonly associated with a received communication.

FIG. 8 represents the output remote interface 670 where provide communication received 671 provides an email, blog "like" or similar social media, text-message, and the like visual interface to the user where the visual interface is of the type commonly associated with a received communication. In 672, the output remote interface 670 receives the message from the input remote interface 660 and visually and/or audibly notifies the user that a new communication was received. As an example, in the case of email, a highlighted message would appear in the inbox with a "[1]" appearing next to the inbox, a "you've got mail" visual or audible message, and the like. In 673, the output remote interface 670 holds the message until the user clicks on an icon or the like displayed on the user input/feedback electronic device 605 to instruct the output remote interface 670 to display the communication data on the user input/feedback electronic device 605.

In 674, the output remote interface 670 provides a readable-message interface including the textual and any additional information associated with the communication, such as images, emojis, stickers, video clips, signatures, and the like. In 675, the user can close the readable-message interface as provided in 674 via the user input/feedback electronic devices 605 after choosing to highlight and copy any desired text to a separate application that unlike the local device review system 650 can transmit the communication, thus being transmission-capable. In addition to highlighting and copying, the local device review system 650 may be configured where the user has the option to transfer the communication to a separate transmission-capable application residing on the computing device 600, which unlike the local device review system 650, can transmit the communication beyond the computing device 600.

In 676, the user can then determine if they wish to retain the communication in the "inbox" or the like or delete the communication, thus permanently deleting or optionally transferring the communication to a deleted items folder or the like. In 677, the user may close the output remote interface 670. If the message is retained, the user can return to the local device review system 650 later and copy text from the output remote interface 670 to paste into or otherwise transfer the communication to a separate transmission-capable application residing on the computing device 600. As previously represented in FIG. 4 and FIG. 5 for a single computing device, a text-message system can similarly be implemented on the computing device 600.

To provide a clear and more consistent understanding of the specification and claims of this application, the following definitions are provided.

The terms "a", "an", and "the" used in the specification claims are to be construed to cover both the singular and the plural, unless otherwise indicated or contradicted by context. No language in the specification should be construed as indicating any non-claimed element to be essential to the practice of the invention.

Described methods can be performed in any suitable order unless otherwise indicated or contradicted by context.

The simplified drawings do not illustrate all the various connections and assemblies of the various components, however, those skilled in the art will understand how to implement such connections and assemblies, based on the illustrated components, figures, and provided description.

The term "local device" means the device that performs the described operations including implementing the optional delay that lacks the ability to transmit communication data outside of itself. Thus, the local device may be the device the user is using that is performing the described review system operations, or the local device may be remote from the user, in electrical communication with the user input/feedback electronic device that the user is using, and thus remotely performing the described review system operations. When the local device is remote, the user input/feedback electronic device being used by the user generally only provides visual and keystroke interaction with the user, while the remote local device is performing the described review system operations. The user input/feedback electronic device being used by the user and the remote local device may both perform different portions of the described review system operations.

The term "computing device" means one or more computing devices in electrical communication including a local device review system that cannot transmit electronic communication data outside of the computing device. The computing device may include a separate, additional application that the local device review system can transfer electronic communication data to that is transmission capable.

While the present general inventive concept is illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

Electrical communication means either wired or wireless.

While various aspects of the invention are described, it will be apparent to those of ordinary skill in the art that other embodiments and implementations are possible within the scope of the invention. Accordingly, the invention is not to be restricted except considering the attached claims and their equivalents.

The invention claimed is:

1. A computing device for creating, processing, and reviewing electronic communications locally, the computing device comprising:
    memory, a processor, a user input device, and a user feedback device in electrical communication, where the memory includes software that when executed by the processor implements an input interface and an output interface on an output device;
    where the input interface provides an electronic communication visual interface to a user,
    where when the user instructs the input interface to generate an electronic communication screen, the input interface permits the user to enter communication data in a form of textual information to form an electronic communication,
    where when the user instructs the input interface to send the electronic communication, the input interface provides feedback to the user establishing that the electronic communication was sent,
    where the electronic communication is sent to the output interface and the output interface signals the user that the electronic communication was received,
    where the output interface allows the user to open and review the electronic communication, and
    where the electronic communication cannot be transmitted outside of the computing device as the input interface and the output interface lack capability to transmit the electronic communication outside of the computing device.

2. The computing device of claim 1, where the input interface further permits the user to enter communication data into the input interface as field information chosen from a TO field, a CC field, a BCC field, and a SUBJECT field.

3. The computing device of claim 1, where a preselected time delay value controls when the output interface signals to the user that the electronic communication was received in response to the user instructing the input interface to send the electronic communication.

4. The computing device of claim 3, where the preselected time delay value is at least five minutes.

5. The computing device of claim 3, where the preselected time delay value is from one hour to three days.

6. The computing device of claim 1, where after the output interface allows the user to open and review the received electronic communication, the output interface allows the user to retain or permanently delete the electronic communication.

7. The computing device of claim 1, where the input interface is an input user interface, and the output interface is an output user interface.

8. The computing device of claim 1, where the input interface is an input remote interface, and the output interface is an output remote interface.

9. The computing device of claim 1, further comprising a network in electrical communication with a remote local interface,
    where the remote local interface is in electrical communication with a processor of a remote local device, and
    where the network is in electrical communication with a user device interface in electrical communication with a processor of a user input/feedback electronic device.

10. The computing device of claim 9, where the network cannot transmit the electronic communication outside of the computing device.

11. The computing device of claim 1, where text of the electronic communication can be copied and pasted into a separate transmission-capable application residing on the computing device.

12. The computing device of claim 1, where text of the electronic communication can be transferred to a separate transmission-capable application residing on the computing device.

13. The computing device of claim 1, where the electronic communication is chosen from email, blog post, micro-blog post, vlog post, social media post, text-message, and combinations thereof.

14. A method of creating, processing, and reviewing electronic communications locally, the method comprising;
    inputting into an input interface appearing to be a transmission-capable electronic communication system electronic communication data to create an electronic communication;
    instructing the input interface to transmit the electronic communication, where the input interface signals that the electronic communication was transmitted; and
    instructing an output interface to display the electronic communication for review in response to the output interface signaling that the electronic communication was received from the input interface, where the electronic communication cannot be transmitted outside of a computing device as the input interface and the output interface lack capability to transmit the electronic communication outside of the computing device comprising the input interface and the output interface.

15. The method of claim 14, where in response to the instructing the input interface to transmit the electronic communication, using a preselected time delay value to determine when the output interface signals that the electronic communication is received.

16. The method of claim 15, where the preselected time delay value is at least five minutes.

17. The method of claim 15, where the preselected time delay value is from one hour to three days.

18. The method of claim 14, further comprising instructing the output interface to permanently delete the electronic communication.

19. The method of claim 14, further comprising instructing the output interface to transfer the electronic communication to a folder.

20. The method of claim 14, further comprising instructing the output interface to transfer the electronic communication to a separate transmission-capable application residing on the computing device.

21. The method of claim 14, where the input interface is an input user interface, and the output interface is an output user interface.

22. The method of claim 14, where the input interface is an input remote interface, and the output interface is an output remote interface.

23. The method of claim 22, further comprising:

a user device interface of a user input/feedback electronic device providing instructions to a remote local interface through a network; and the remote local interface of a remote local device providing different instructions to the user device interface of the user input/feedback electronic device through the network.

24. The method of claim 23, where the network cannot transmit the electronic communication outside of the computing device.

25. The method of claim 14, where the electronic communication is chosen from email, blog post, micro-blog post, vlog post, social media post, text-message, and combinations thereof.

* * * * *